(No Model.)  3 Sheets—Sheet 3.
G. D. BURTON.
ELECTRIC METAL HEATING APPARATUS.
No. 486,625.  Patented Nov. 22, 1892.
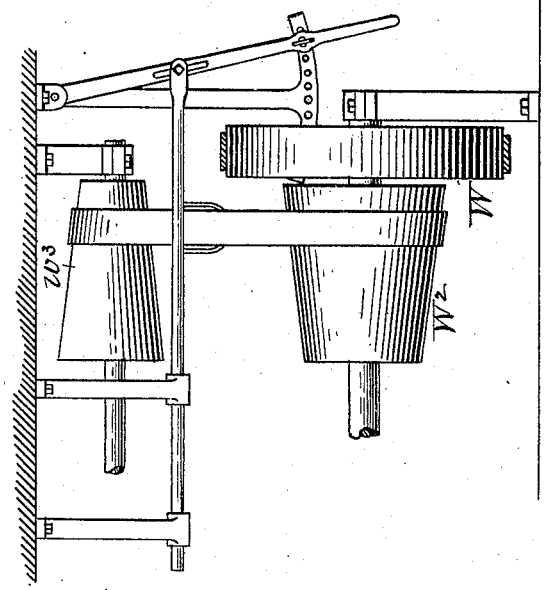
Fig. 4.
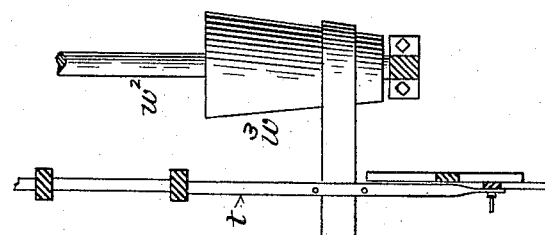
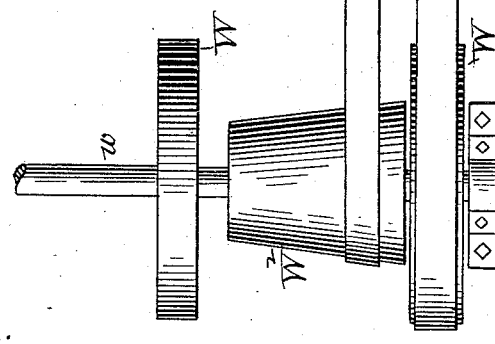
Fig. 5.
WITNESSES:  INVENTOR:
Geo. D. Burton
By F. C. Somes,
Attorney.

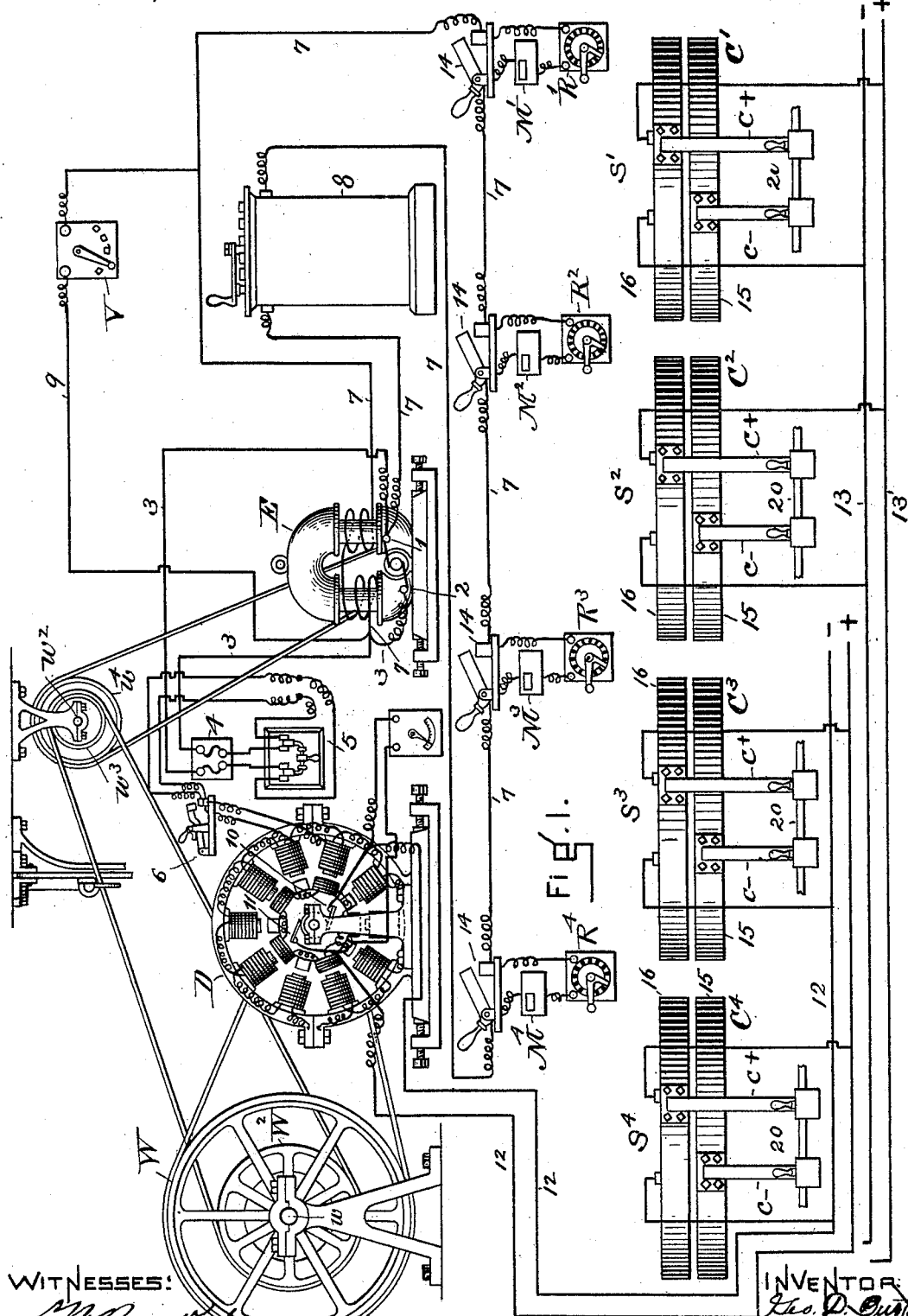

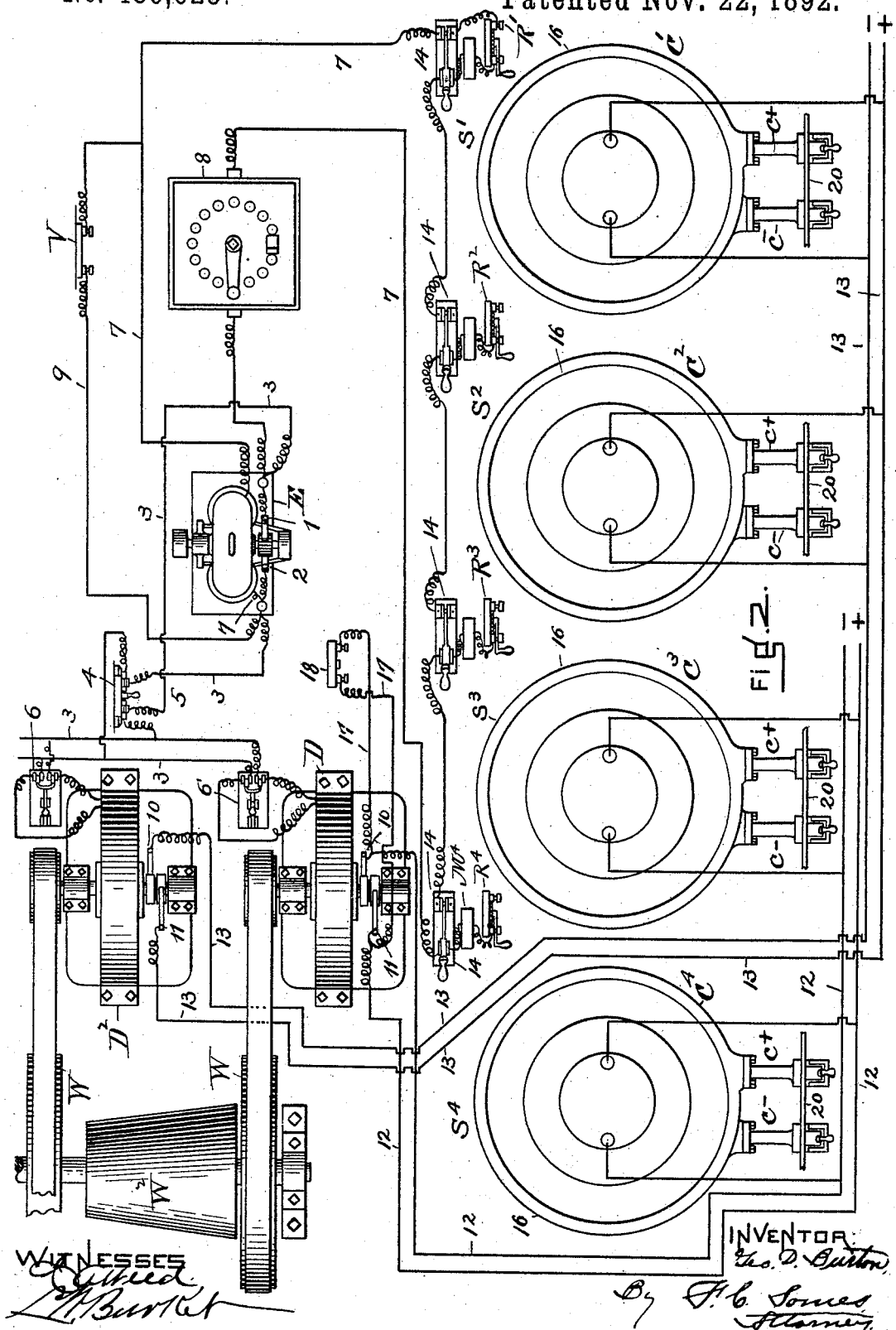

UNITED STATES PATENT OFFICE.

GEORGE D. BURTON, OF BOSTON, MASSACHUSETTS, ASSIGNOR TO THE ELECTRICAL FORGING COMPANY, OF MAINE.

ELECTRIC METAL-HEATING APPARATUS.

SPECIFICATION forming part of Letters Patent No. 486,625, dated November 22, 1892.

Application filed October 21, 1891. Serial No. 409,389. (No model.)

*To all whom it may concern:*

Be it known that I, GEORGE D. BURTON, of Boston, in the county of Suffolk and State of Massachusetts, have invented a new and useful Improvement in Apparatus for Electric Heating, of which the following is a specification.

My invention relates to mechanism for heating metals by electricity preparatory to forging or working the same; and it consists in the new and useful constructions, combinations, and methods of electrically connecting the same, substantially as hereinafter described and claimed.

In the drawings, Figure 1 represents in side elevation the electrical mechanism for producing the primary currents in a central station or location and a series of sub-stations or locations, each provided with the converters and heating-clamps or metal holders for heating the metal, and also provided with a regulating device arranged to govern the current from the central station necessary to operate the converter at the sub-station. Fig. 2 is a top plan view of the central station, sub-stations, and their converters and electric regulators with their electrical connections with the main station, as shown in Fig. 1. Fig. 3 represents in plan view the arrangement of the counter-shafts and cone-pulleys for varying the speed of the exciter which excites the fields of the alternating-current dynamo. Fig. 4 is an end elevation of the same.

In Fig. 1, W is the driving-pulley of the counter-shaft $w$, which drives the alternating-current dynamo D to supply the current, and $W^2$ is the pulley which drives another counter-shaft $w^2$, attached to the ceiling by the pulley $w^3$ connected thereto.

$w^4$ is another pulley attached to the shaft $w^2$, which drives the exciter E for exciting the field of the dynamo D. The amount of power furnished by the dynamo D depends directly upon the amount of exciting-current sent through its field-coils from the exciter E.

E is a self-exciting dynamo of the ordinary construction, having its circuit 3 from its commutator-brushes 1 2 leading through the cut-out 4 and the switch 5 to the field-coils of the dynamo D. The switch 6 is the one directly connected with the dynamo D to throw the exciter-current onto the same. A shunt-circuit 7 leads from the brush 1 through the resistance coil or apparatus 8 and through the resistance-coils $R^4$, $R^3$, $R^2$, and $R'$ at the several sub-stations and thence around the field-magnets of the exciter back to the brush 2. A subsidiary shunt-circuit 9 on the circuit 7 bridges the field-coils of the exciter and has located on it the voltmeter or ammeter V to indicate the voltage of the exciter-current passing over the shunt-circuit 7.

From the brushes 10 11 of the dynamo D the main circuit 12 leads to the converters $C^4$ $C^3$ at the stations $S^4$ $S^3$, while from a second dynamo $D^2$ a similar primary circuit 13 leads to the converters $C^2$ $C'$ at the sub-stations $S^2$ $S'$. Each of the stations is provided with a switch 14, which can be used to cut out of circuit its resistance-coil on the line 7, as well as to cut out the meter $M'$, $M^2$, $M^3$, or $M^4$, belonging to the same station. When the switch 14 is closed the current passes unobstructed by the station and no electricity is registered at its meter as being used; but when the operator at the station desires to use his converter he throws open the switch 14 and the effect will be to throw resistance into the circuit 7 from the resistance-coil $R'$ $R^2$ $R^3$, as the case may be, and obstruct the flow of the exciter-current over the circuit 7. This forces a larger amount of the exciter-current over the circuit 3, and this produces more primary current from the alternating-current dynamo D over the circuit 12, thereby furnishing the converter at that station with the needed addition to its primary current to enable it to do the work. The dynamos D and $D^2$, as shown in the plan, Fig. 2, are connected to the circuit 3 in parallel so that the same exciter-current energizes the fields of both.

The pulley $W^2$ on the counter-shaft $w$ is made in the shape of a cone, and the corresponding pulley $w^3$ on the counter-shaft $w^2$ is also made in the form of a cone, reversed end for end with relation to the pulley $W^2$. The belt between them is provided with a belt-shifter $t$ for moving it along on the cones, so as to increase or diminish the speed of the exciter E when the second dynamo D² is brought into operation. This second dynamo is driven from the counter-shaft $w$ by means of a second pulley W attached thereto. The circuit 13 extends from the brushes 10 11 of the dynamo D² in the same manner that the circuit 12 extends from the dynamo D, and it supplies the converters C² C' with the electric current to operate them. Each converter has arms and clamps $c-$ $c+$, attached to its outer rings 15 16. The terminals of the secondary coils of the converter are connected to these rings in the usual manner, the core of the converter being annular in form to allow of this construction. The dynamo D has a shunt-circuit 17, connected to its brushes 10 11, and in this circuit is placed the voltmeter 18, which indicates the amount of the primary current produced by the dynamo. The bars 20 are placed in the clamps of the converters so as to complete the circuit through the arms and clamps $c-$ $c+$, and having a much higher resistance than the other parts of the secondary circuit of the converter they are heated thereby to the desired degree of temperature.

As is shown in the views, the several converters are attached to the primary circuit 12 or 13 in parallel.

It is to be understood that the claims referring to an alternating current include an intermittent or pulsating current as the equivalent thereof.

What I claim as new and of my invention is—

1. The combination, in an apparatus for heating metals by electricity, of a main dynamo located at the central station and arranged to supply its alternating electric current to a sub-station, an exciter-dynamo, also located at the central station and arranged to excite the field-magnets of said main dynamo, an electrical converter located at said sub-station and arranged to receive the alternating current of said main dynamo and convert it into a current of lower potential, a pair of metal holders located in the secondary circuit of said converter and arranged to complete the secondary circuit through the bar placed in them to be heated, an adjustible resistance coil or apparatus located at said sub-station where said converter is placed within reach of the operator thereof, and an electric circuit connecting said resistance-coil to the exciter and arranged to regulate the electric current passing from the exciter to said main dynamo, substantially as described.

2. The combination, in an apparatus for heating metals by electricity, of a main dynamo located at the central station and arranged to supply its alternating current to a series of sub-stations, an exciter-dynamo, also located at the central station and arranged to excite the field-magnets of said main dynamo, electrical converters located at each of said sub-stations and respectively arranged to receive the alternating current of said main dynamo and convert it into a current of lower potential, a pair of metal-holders located in the secondary circuit of each of said converters, and a series of resistance-coils located one at each of said sub-stations adjacent to the converter thereof and all connected by an electrical circuit with said exciter and arranged to jointly or separately regulate the current passing therefrom to the field of the main dynamo, substantially as described.

3. The combination of the main driving-shaft $w$, the dynamo D, connected thereto by intermediate driving mechanism, the exciter-dynamo E, arranged to excite the field-coils of the dynamo D and connected to said shaft $w$ by intermediate driving mechanism constructed to vary the relative speed of the armature of dynamo E to said shaft $w$ at the will of the operator, and a converter $C^4$, having its primary circuit connected to said dynamo D and provided with metal-holders in its secondary circuit for receiving the bar of metal to be heated, substantially as described.

4. The combination, in an apparatus for heating metals by electricity, of the main dynamo located at the central station and arranged to supply its alternating electric current to a sub-station, an exciter-dynamo, also located at the central station and arranged to excite the field-magnets of the said main dynamo, an electrical converter located at said sub-station and arranged to receive the alternating current of said main dynamo and convert it into a current of lower potential, a pair of metal-holders located in the secondary circuit of said converter and arranged to complete the secondary circuit through the bar placed in them to be heated, an adjustable resistance coil or apparatus located at said sub-station, and an electrical shunt-circuit connecting the said resistance-coil to the armature of the exciter and arranged to regulate the electric current passing from the exciter to said main dynamo, substantially as described.

5. The combination of the main dynamo producing alternating currents, the exciter-dynamo E, connected to the field-coils of the main dynamo and arranged to excite them, and a resistance coil or apparatus placed in a shunt-circuit connected with the armature of the exciter-dynamo and arranged to force a greater amount of electric current into the field-coils of the main dynamo by increasing the resistance in the shunt-circuit of the exciter-dynamo, substantially as described.

6. The combination of the main dynamo D, constructed to produce alternating electric currents, the exciter-dynamo E, connected to the field-coils of the said main dynamo, the shunt-circuit 7, connected to the armature of the exciter-dynamo and passing around the field-magnets thereof, the adjustable rheostat 8, located in said circuit 7, and the shunt or bridge circuit 9, connected at each end with the circuit 7 around the field-coils of the exciter E and containing the ammeter or voltmeter V, subtantiatly as described.

7. The combination of the main dynamo D, constructed to produce alternating electrical currents, the exciter-dynamo E, electrically connected with the field-magnets thereof, the converter $C^4$, connected to the main dynamo by the circuit 12 and arranged to convert the electric current into one of lower potential, the metal-holders $c-$ $c+$, connected in the secondary circuit of the converter, the electrical circuit 7, leading from the exciter E to a point adjacent to the converter $C^4$ and provided at that point with the switch 14, the meter $M^4$, and the adjustable resistance-coil $R^4$, all located in said circuit, substantially as described.

GEO. D. BURTON.

Witnesses:
   CHESTER MARR,
   R. W. GALLUPE.